(12) United States Patent
Sircar et al.

(10) Patent No.: US 6,322,612 B1
(45) Date of Patent: Nov. 27, 2001

(54) PSA PROCESS FOR REMOVAL OF BULK CARBON DIOXIDE FROM A WET HIGH-TEMPERATURE GAS

(75) Inventors: Shivaji Sircar, Wescosville; Catherine Marie Anne Golden, Allentown, both of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/471,982

(22) Filed: Dec. 23, 1999

(51) Int. Cl.[7] .................................................. B01D 58/047
(52) U.S. Cl. .................................. 95/97; 95/104; 95/139; 96/145
(58) Field of Search ............................... 95/96–106, 139; 96/145

(56) References Cited

U.S. PATENT DOCUMENTS

| | | | |
|---|---|---|---|
| 3,729,902 | * | 5/1973 | Ventriglio et al. ............ 96/145 X |
| 4,433,981 | * | 2/1984 | Slaugh et al. ................. 95/139 |
| 5,137,547 | * | 8/1992 | Chretien ........................ 95/97 X |
| 5,183,482 | | 2/1993 | Najjar et al. .................. 55/16 |
| 5,520,894 | * | 5/1996 | Heesink et al. ............... 95/139 X |
| 5,656,064 | * | 8/1997 | Golden et al. ................ 95/139 X |
| 5,667,561 | * | 9/1997 | Suzuki et al. ................. 95/139 |
| 5,917,136 | * | 6/1999 | Gaffney et al. ............... 95/139 X |
| 6,024,781 | * | 2/2000 | Bulow et al. .................. 95/105 X |

FOREIGN PATENT DOCUMENTS

| | | | |
|---|---|---|---|
| 0723802 | 7/1996 | (EP) | B01D/53/62 |
| 0269704 | 4/1994 | (JP) | B01D/53/04 |

OTHER PUBLICATIONS

"Gas and Liquid Sweetening", 2nd ed., Maddox, R.N., Published by John M. Campbell (1974).
"Spiral–Wound Permeators For Purification and Recovery", Schell, N.J., and C.D. Hoston, Chem. Eng. Prog. 33 (1982).
"Separation of Methane and Carbon Dioxide Gas Mixtures by Pressure Swing Adsorption", Sircar, S., Sci. Tech., 23, 519–529 (1988).
"New Pore Size Control of SiO2 Membrane", Ohsima, Y., Seki, Y., and H. Maruyama, Key Engrg. Materials 159, 275–280, (1999).
"Fiber Reinforced Porous Alumina Substrate Consisting of Layer with Distinct Grain Sizes," Ando, Y., Y. Hirano, S. Mase and H. Taguchi, Proceedings of Fifth International Conference on Inorganic Membranes, pp 652 (1998).
"Carbon Dioxide Removal With Inorganic Membranes," Judkins, R.R., D.E. Fain, US/Japan Workshop on Global Change Research: Environmental Response Technologies, Honolulu, pp 63–70, (1993).

* cited by examiner

Primary Examiner—Robert H. Spitzer
(74) Attorney, Agent, or Firm—Geoffrey L. Chase

(57) ABSTRACT

A pressure or vacuum swing adsorption process and apparatus are used for the separation and recovery of certain gaseous components, such as carbon dioxide from hot gas mixtures containing water vapor. The process comprises introducing the feed gas mixture at an elevated temperature into a feed end of an adsorber column containing an adsorbent. The adsorbent preferentially adsorbs at least one adsorbable component. An adsorber effluent, depleted of the at least one adsorbable component, is withdrawn from a product end of the adsorber column. The adsorber column is depressurized below atmospheric pressure and then purged with steam to withdraw an effluent comprising a mixture of the at least one adsorbable component and $H_2O$. Next, the adsorber column is pressurized by introducing a gas that is depleted of the at least one adsorbable component. The steps are repeated in a cyclic manner.

27 Claims, 4 Drawing Sheets

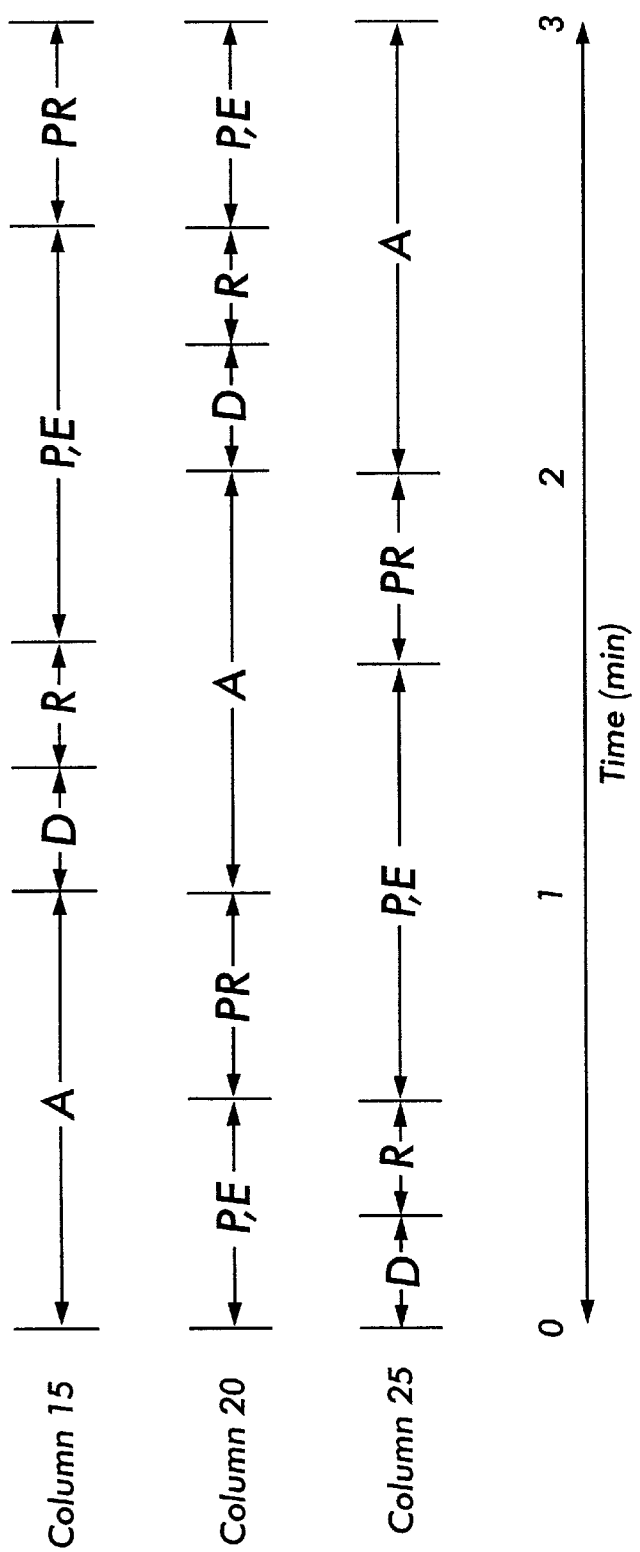

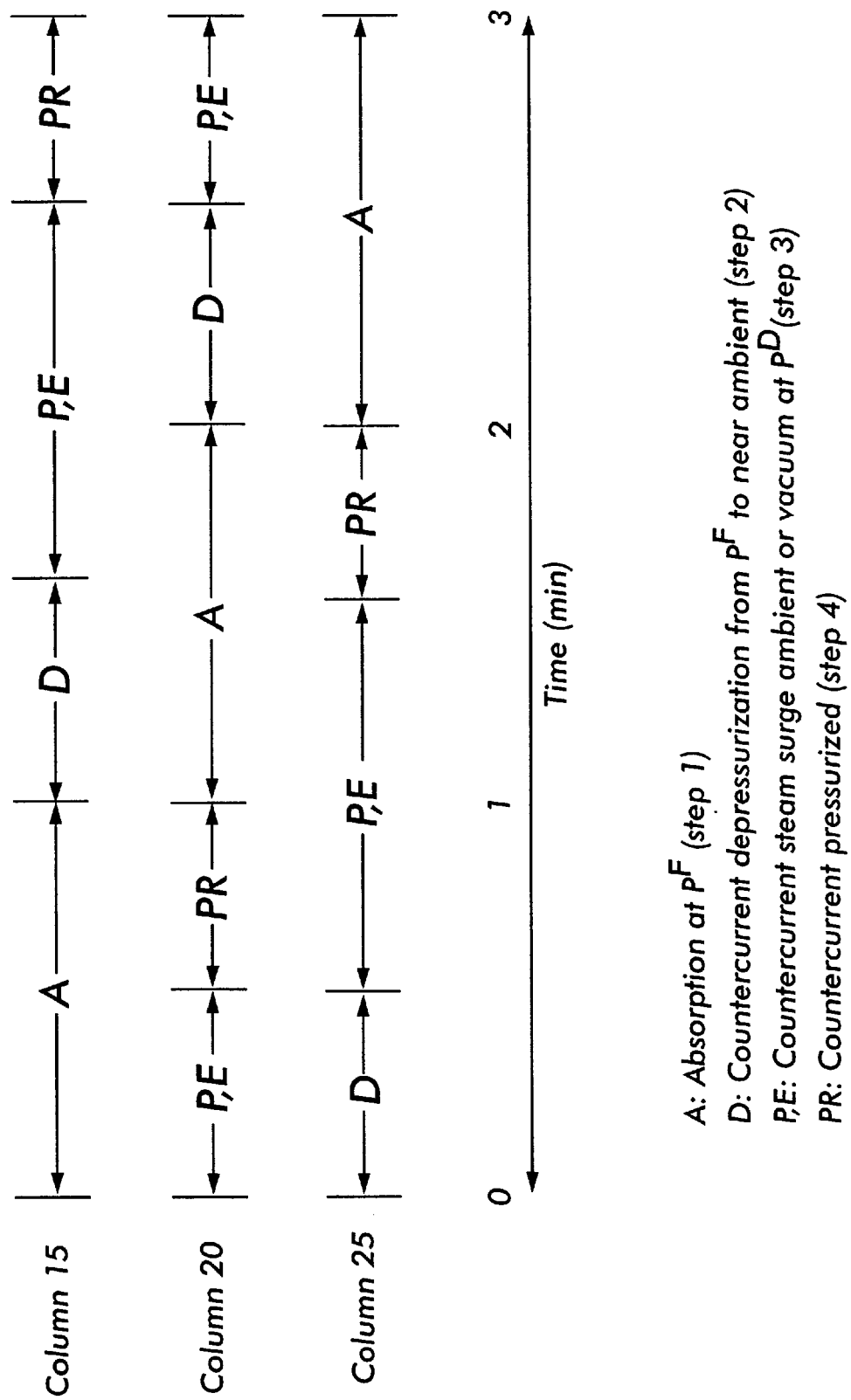

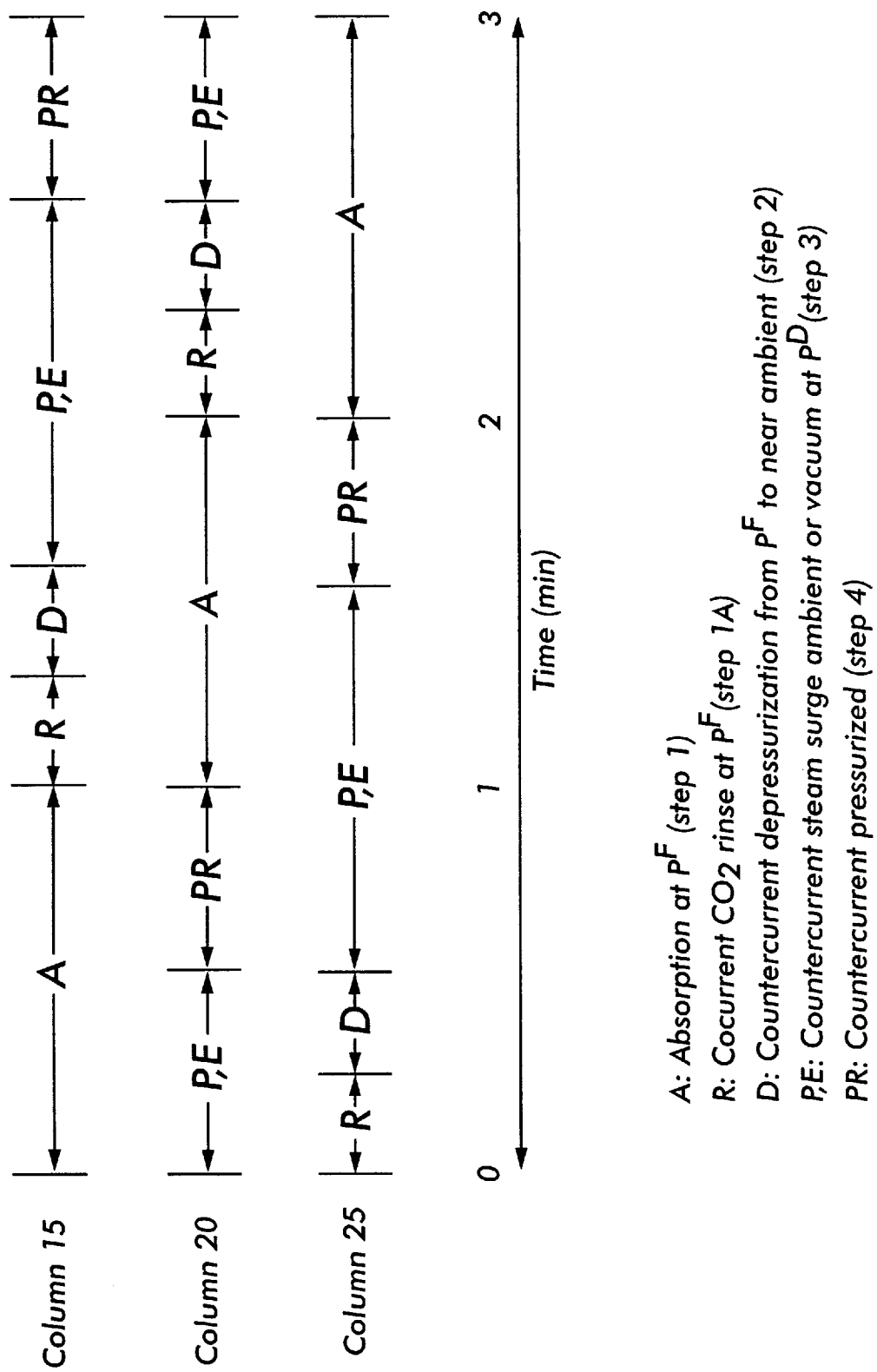

PSA PROCESS FOR REMOVAL OF BULK CARBON DIOXIDE FROM A WET HIGH-TEMPERATURE GAS

STATEMENT REGARDING FEDERALLY SPONSORED RESEARCH OR DEVELOPMENT

Not applicable.

CROSS-REFERENCE TO RELATED APPLICATIONS

Not applicable.

BACKGROUND OF THE INVENTION

The present invention relates to pressure and vacuum swing adsorption processes for the separation and recovery of certain gaseous components such as carbon dioxide from hot gas mixtures containing a substantial quantity of water vapor.

Many chemical, metallurgical and energy producing processes result in the release of carbon dioxide into the atmosphere which causes various environmental problems such as global warming. If the consumption of fossil fuels continues to grow at the present rate, it is estimated that the carbon dioxide discharged by the burning of fossil fuels will by itself raise the average atmospheric temperature of the earth by several degrees over the next thirty to sixty years. Thus, it is desirable to remove and/or recover carbon dioxide from these gases for environmental reasons. It is also desirable to separate and recover carbon dioxide from various mixed gases for further uses, e.g., the manufacture of liquid $CO_2$, or use of $CO_2$ as a chemical feedstock for the manufacture of other chemical products such as methanol.

Known ways of separating and recovering carbon dioxide from mixed gases include (1) selective absorption of carbon dioxide by a physical or chemical solvent; (2) selective permeation of carbon dioxide through a polymeric membrane; and, (3) selective adsorption of carbon dioxide by a pressure or vacuum swing adsorption process.

Separation of a mixed gas under the first method, selective absorption, can produce a carbon dioxide product having a high degree of purity, e.g., greater than 99% carbon dioxide, and a resulting gas mixture that is virtually free of carbon dioxide, e.g., less than 100 p.p.m. Generally, solvents utilized under selective absorption methods may be regenerated by heating with steam, which produces a carbon dioxide-enriched product stream. Typical systems for separating carbon dioxide from mixed gases utilizing selective absorption are described in "Gas and Liquid Sweetening," $2^{nd}$ ed., pp. 98–155, by Dr. R. N. Maddox and published by John M. Campbell, 1974.

The second method, membrane separation, attains the separation of carbon dioxide from a mixed gas by setting in place in the flow path of the mixed gas a membrane capable of selectively permeating carbon dioxide, differentiating the pressure across the membrane, and passing the mixed gas through this membrane. Separation of a mixed gas under this method generally produces a carbon dioxide-enriched, but not pure, product at low pressure and a high-pressure effluent gas containing a dilute amount of carbon dioxide, e.g., less than 2 mole percent. A technique and apparatus for such membrane separation of gases is described in "Spiral-Wound Permeators For Purification and Recovery," pp. 37, by N. J. Schell and C. D. Houston, Chem. Eng. Prog., 33 (1982).

The third method, pressure or vacuum swing adsorption, effects the separation of carbon dioxide from a mixed gas by a procedure which comprises compressing the mixed gas and contacting it with an adsorbent, as for example, zeolites or activated carbons, thereby inducing selective adsorption of carbon dioxide, and then reducing the pressure, thereby desorbing the adsorbed carbon dioxide. Under pressure swing adsorption systems, $CO_2$ is selectively picked up from the mixed gas at high $CO_2$ partial pressure by the adsorbent, and the $CO_2$ is released from the adsorbent by lowering the superincumbent gas phase partial pressure of $CO_2$. A pressure or vacuum swing adsorption system can be designed to produce an essentially carbon dioxide-free stream, e.g., less than 100 p.p.m., at feed gas pressure and a carbon dioxide-enriched stream, e.g., 30–99 mole percent, at near ambient pressure. It should be understood by those skilled in the art that if the adsorption step is performed at superambient pressure and the desorption step is performed at or near ambient pressure, it is known as pressure swing adsorption. If the adsorption step is performed at or near ambient pressure and the desorption step is performed at subambient pressure, it is known as vacuum swing adsorption. For purposes of this application, the generic term pressure swing adsorption also includes the term vacuum swing adsorption. Two pressure swing adsorption processes for the separation of methane and carbon dioxide gas mixtures are described in "Separation of Methane and Carbon Dioxide Gas Mixtures by Pressure Swing Adsorption," pp. 519–528, by S. Sircar, Separation Science and Technology, Vol. 23 (1988).

The first and second methods are generally utilized when the feed gas mixture is available at a high pressure, e.g., greater than 300 p.s.i.g. An example of the application of either the first or the second method is the removal of bulk carbon dioxide, e.g., 10% to 30% carbon dioxide, from natural gas at a high pressure of approximately 700 p.s.i.g. The third method is generally utilized when the feed gas mixture is available at a low to moderate pressure, e.g., between about 10 to 250 p.s.i.g. An example of the third method is the removal of bulk carbon dioxide, e.g., 40% to 60% carbon dioxide, from a landfill gas at a pressure of approximately 100 p.s.i.g.

Each of the above mentioned methods is effective in separating bulk carbon dioxide from a gas mixture so long as the separation is conducted at or near ambient temperature, e.g., 15–40° C. These methods are also most efficient when the feed gas contains less amount of water vapor. These methods are generally very ineffective in separating carbon dioxide from mixed gases at higher temperatures, e.g., in excess of 150° C. For example, under the first method discussed above, the absorptive capacity of chemical solvents decreases significantly at high temperature. The method of polymeric membrane separation cannot be carried out at elevated temperatures, e.g., in excess of 200° C., because the membrane will melt. Some microporous ceramic membranes (silica and alumina) are being developed for selective permeation of $CO_2$ from a hot gas. Such membranes are described in "New Pore Size Control Of $SiO_2$ Membrane," pp. 275–280, by Y. Ohshima, Y. Seki and H. Maruyama, Key Engrg. Materials, Vol. 159 (1999). These membranes, however, are at best enrichment devices in that they provide only low to moderate $CO_2$ permiselectivity and thus would not be suited for recovery of pure $CO_2$ or production of $CO_2$-free product.

Under pressure or vacuum swing adsorption, even in the absence of water vapor, the adsorption capacity and selectivity of conventional physical adsorbents such as alumina, silica gels, zeolites or activated carbon, decreases exponentially as the temperature of the feed gas mixture increases, making the separation process impractical. Even at or near ambient temperature, some of these conventional adsorbents such as alumina and silica gels, and zeolites become ineffective at $CO_2$ removal where there is even a small amount of water vapor present in the feed gas. The water vapor must be removed from the feed gas prior to carbon dioxide separation.

There is a need for the removal of bulk carbon dioxide from effluent gases at high temperature where a high water vapor content may be present such as in chemical, metallurgical and power generation industries, as mentioned above. For example, in an oxygen-blown coal-fired power plant, the gasifier effluent after desulfurization, water gas shift reaction, and partial cooling to 300–400° C. contains approximately 38.5% $CO_2$, approximately 7.1% CO, approximately 52.3% $H_2$, approximately 1.5% $N_2$, approximately 0.1% $H_2O$ and approximately 0.005% ($H_2S$+COS) at approximately 310 p.s.i.g. This heated gas is then expanded in a turbine for power generation. If the gas is cooled for $CO_2$ removal by conventional methods, it must thereafter be reheated for expansion prior to being utilized in the turbine. This results in an enormous amount of heat exchange which requires a significant amount of apparatus and cost. Moreover, heat exchangers are somewhat inefficient and each time the mixed gas is cooled and reheated, there is some loss of heat, e.g., 20 to 30%, which cannot be recovered and utilized by the turbine. Thus, there is a need for $CO_2$ removal and recovery from this gas at approximately 300–400° C. without cooling. Under the prior art pressure or vacuum swing adsorption methods discussed above, $CO_2$ removal and recovery cannot take place until the temperature of the effluent gases is first reduced to approximately ambient temperature.

As a second example, it is desirable to recycle into a furnace as feed gas at an elevated temperature without cooling, the effluent gas resulting from the metallurgical reduction of iron ore. The effluent gas resulting from the reduction process contains approximately 17% $CO_2$, 27% CO, 50% $H_2$, 2% $H_2O$, 3% $CH_4$, 1% $N_2$ and 100 p.p.m. $H_2S$ and is at an elevated temperature of approximately 260° C. and a pressure of about 45–60 p.s.i.g. In order to recycle this effluent gas to the reduction furnace as $CO_2$-free feed gas, it is necessary to remove $CO_2$ without cooling. Under the prior art pressure or vacuum swing adsorption methods discussed above, $CO_2$ removal and recovery cannot take place until the temperature of the effluent gases is first reduced to approximately ambient temperature. Thus, there is a large incentive for removal and recovery of $CO_2$ from wet gases at the elevated feed gas temperature.

Other examples of methods for removal of $CO_2$ from a hot gas by membrane separation are described in "Carbon Dioxide Removal With Inorganic Membranes," pp. 63–70, by R. R. Judkins and D. E. Fain, U.S./Japan Workshop on Global Change Research: Environmental Response Technologies, Honolulu (1993); U.S. Pat. No. 5,183,482; and European Patent Application Publication No. 0-723-802-A2.

It is desired to have an efficient process to remove carbon dioxide from hot gaseous mixtures containing water vapor without the necessity of cooling the mixtures.

It is further desired to have a process wherein the specific gaseous components can be converted with high efficiency into various useful organic substances, such as carbon dioxide, which can be reclaimed at a low cost.

BRIEF SUMMARY OF THE INVENTION

The present invention relates to pressure and vacuum swing adsorption processes for the separation and recovery of certain gaseous components such as carbon dioxide from hot gas mixtures containing water vapor. The present invention also relates to an apparatus for performing these processes. A first embodiment involves multiple steps. The first step is to introduce into an adsorber column, the hot gas mixture containing the adsorbable gaseous component, e.g., $CO_2$, at an elevated temperature and pressure. This hot gas mixture is also known as the feed gas. The adsorber column contains an adsorbent that is capable of adsorbing the adsorbable gaseous component from the hot gas mixture at the elevated temperature and pressure. The adsorbent is selected from the group consisting of $K_2CO_3$ promoted hydrotalcite, $Na_2O$ impregnated alumina, and double salt extrudates. During the adsorption step, the gas effluent withdrawn from the adsorber column is depleted of the adsorbable gaseous component. The next step is to depressurize the adsorber column by withdrawing a depressurization gas enriched in the adsorbable gaseous component. The next step is to purge the adsorption column by introducing steam which is heated to a temperature at or near that of the feed gas mixture and withdrawing from the adsorber column an adsorber effluent comprising a mixture of the adsorbable gaseous component and water vapor. The purge step is carried out while the adsorber column is maintained at sub-atmospheric pressure. The next step is to pressurize the adsorber column by introducing a repressurizing gas that has been depleted of the adsorbable gaseous component. These steps are repeated in a cyclic manner.

In a variation of the first embodiment, the depressurization gas utilized in the depressurization step flows countercurrent to the direction of the introduction of the feed gas mixture.

In another variation of the first embodiment, the steam utilized in the purge step flows countercurrent to the direction of the feed gas mixture.

In another variation of the first embodiment, the gas depleted of the one adsorbable gaseous component flows countercurrent to the direction of the feed gas mixture during the repressurization step.

In another variation of the first embodiment, the feed gas contains principally $CO_2$, CO, $H_2$, $N_2$, $H_2O$, $H_2S$+COS, the elevated temperature is about 300° C. to 400° C., and the adsorbable gaseous component is $CO_2$.

In another variation of the first embodiment, the feed gas contains principally $CO_2$, CO, $H_2$, $N_2$, $H_2O$, $CH_4$, $N_2$, and $H_2S$, the elevated temperature is about 260° C., and the adsorbable gaseous component is $CO_2$.

In another variation of the first embodiment, the pressure of the feed gas mixture is between 100–400 p.s.i.g.

In another variation of the first embodiment the pressure of the feed gas mixture is between about 5 p.s.i.g. and about 60 p.s.i.g.

In another variation of the first embodiment the adsorber column is depressurized during the depressurization step to a final pressure near an ambient pressure.

In another variation of the first embodiment, a step is added to the steps in the first embodiment. The additional step immediately follows the purge step and comprises removing by condensation the $H_2O$ from the mixture of the adsorbable gaseous component and $H_2O$ to obtain a gas stream rich in the adsorbable gaseous component.

In yet another variation of the first embodiment the feed gas mixture contains principally $CO_2$ and an inert gas (weakly adsorbing) at a pressure of approximately 8.62 bar, the elevated temperature is about 200° C., the at least one adsorbable component is $CO_2$, and the adsorbent is $Na_2O$ impregnated alumina.

A second embodiment has one step in addition to the steps in the first embodiment. The additional step is to rinse the adsorber column with a gas stream rich in the one adsorbable gaseous component wherein the gas stream flows co-current to the direction of the introduction of the feed gas mixture. Under this second embodiment, this rinse step comes before the depressurization step.

A third embodiment has one step in addition to the steps in the first embodiment. The additional step is to rinse the adsorber column with a gas stream rich in the one adsorbable gaseous component wherein the gas stream flows co-current to the direction of the introduction of the feed gas mixture. Under this third embodiment, this rinse step follows the depressurization step.

In a variation of the third embodiment the step involving introducing the feed gas into the adsorber column has a duration of about 60 seconds, the depressurization step has a duration of about 15 seconds, the rinsing step has a duration of about 15 seconds, the purging step has a duration of about 60 seconds, and the repressurization step has a duration of about 30 seconds.

The present invention also includes an apparatus for the separation and recovery of certain gaseous components such as carbon dioxide from hot gas mixtures containing water vapor. The apparatus comprises (1) an adsorber column containing an adsorbent which preferentially adsorbs the adsorbable gaseous component from the hot gas mixture at the elevated temperature and pressure, the adsorber column having a feed end and a product end, (2) means for introducing at an elevated temperature and at an elevated pressure the feed gas mixture into the feed end of the adsorber column and withdrawing from the product end of the adsorber column an adsorber effluent depleted of the adsorbable gaseous component, (3) means for depressurizing the adsorber column by withdrawing therefrom a depressurization gas enriched in the at least one adsorbable component, (4) means for rinsing the adsorber column with a gas stream rich in the one adsorbable gaseous component wherein the gas stream flows co-current to the direction of the introduction of the feed gas mixture, (5) means for purging the adsorber column by introducing therein a steam heated to a temperature at or near that of the feed gas mixture and withdrawing from the adsorber column an adsorber effluent comprising a mixture of the at least one adsorbable component and $H_2O$, and, (6) means for pressurizing the adsorber column to approximately the elevated pressure by introducing into the adsorber column a repressurizing gas depleted of the at least one adsorbable component.

BRIEF DESCRIPTION OF SEVERAL VIEWS OF THE DRAWINGS

FIG. 2 is a chart setting forth a sequence of steps comprising a third embodiment of the PSA system of the present invention, the sequence being performed in the three adsorption columns arranged in parallel;

FIG. 3 is a chart setting forth a sequence of steps comprising a first embodiment of the PSA system of the present invention, the sequence being performed in the three adsorption columns arranged in parallel; and, FIG. 4 is a chart setting forth a sequence of steps comprising a second embodiment of the PSA system of the present invention, the sequence being performed in the three adsorption columns arranged in parallel.

DETAILED DESCRIPTION OF THE INVENTION

Figure 1:
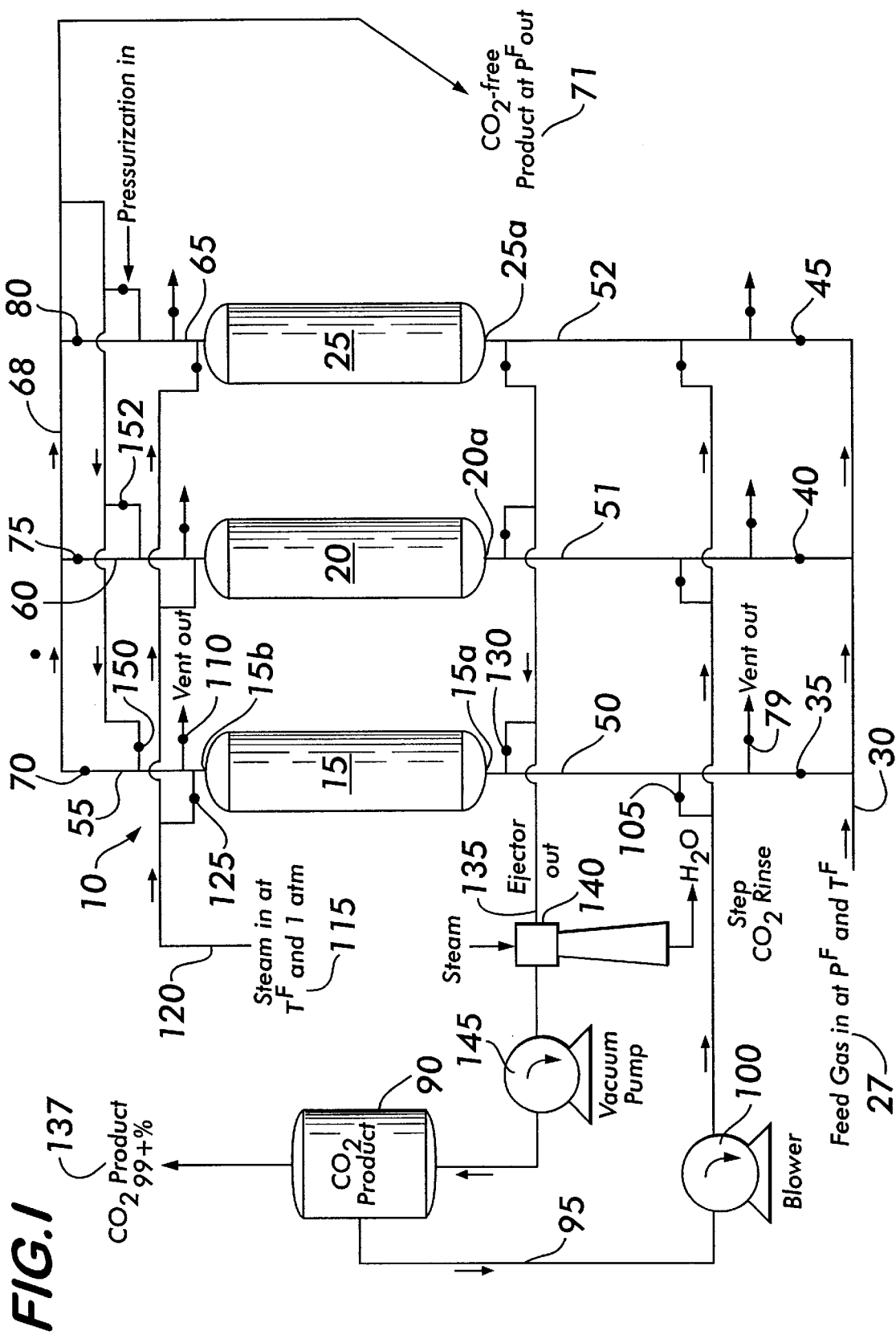
FIG. 1 is a schematic flow diagram of the pressure swing adsorption system of the present invention employing three adsorption columns operated in parallel.

Referring now to the drawings, wherein like reference numerals refer to like parts, there is shown in FIG. 1 a flow diagram illustrating the process and apparatus 10 of the present invention. A group of adsorption columns are labeled respectively 15, 20 and 25. The feed gas 27 to be separated may be delivered to a selected one of the adsorption columns from a feed gas manifold 30 by opening the appropriate one of the valves 35, 40, or 45 which permit flow communication between the manifold 30 and the inlet end of the adsorption columns 15, 20 and 25 through the connecting gas lines 50, 51 and 52. Inlet ends of adsorption columns 15, 20 and 25 are designated as 15a, 20a and 25a, respectively. At the outlet end of each of the adsorption columns 15, 20 and 25, there is a gas flow line 55, 60 and 65, respectively. The lines 55, 60 and 65 can be connected to a gas manifold 68 selectively by selective openings of the valves 70, 75 and 80, respectively.

In a first embodiment, a feed gas 27 containing less strongly adsorbed components, water vapor and bulk $CO_2$ impurity is provided at an elevated temperature ($T^F$ or feed temperature), e.g., 150° C. or more, and is compressed to a superatmospheric pressure ($P^F$ or feed pressure), e.g., anywhere from near ambient pressure to 500 p.s.i.g., from the feed manifold 30 into one of the adsorption columns then on the adsorption stroke of the cycle. For example, the feed gas provided into the system 10 could be an effluent resulting from a coal fired power plant, the effluent containing approximately 38.5% $CO_2$, 7.1% CO, 52.3% $H_2$, 1.5% $N_2$, 0.1% $H_2O$ and 0.005% ($H_2S$+COS) at an approximate temperature between 300–400° C. and a superatmospheric pressure of approximately 310 p.s.i.g. Alternatively, the feed gas provided into the system 10 could be an effluent resulting from the metallurgical reduction of iron ore, the effluent containing approximately 17% $CO_2$, 27% CO, 50% $H_2$, 2% $H_2O$, 3% $CH_4$, 1% $N_2$ and 100 p.p.m. $H_2S$ at a temperature of approximately 260° C. and superatmospheric pressure of about 45–60 p.s.i.g. Thus, if column 15 is then on-stream, the feed gas mixture is introduced into the inlet end 15a of column 15 through open valve 35 in gas line 50.

An adsorbent which preferentially adsorbs $CO_2$ from a wet gas at high temperatures is packed in the column. This adsorbent can be selected from a family of chemisorbents including $K_2CO_3$ promoted hydrotalcite, $Na_2O$ impregnated alumina, or double salt extrudates. Any of these chemisorbents can reversibly remove $CO_2$ from a wet gas in the temperature range of 150 to 450° C. These chemisorbents exhibit high $CO_2$ adsorption capacity and selectivity in the presence of excessive amounts of steam. Moreover, the rates of $CO_2$ adsorption on these chemisorbents are fast at elevated temperatures, i.e., between 150° C. and 450° C. The method of preparation of such materials is shown, for example, in U.S. Pat. No. 5,917,136 entitled Carbon Dioxide Pressure Swing Adsorption Process Using Modified Alumina Adsorbents, the disclosure of which is hereby incorporated by reference.

Other chemisorbents which preferentially adsorb $CO_2$ from a wet gas at high temperatures include modified double layered hydroxides and non-modified and modified spinels.

The modified double layered hydroxides which possess utility as $CO_2$ adsorbents are represented by the general formula:

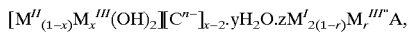

wherein
$M^I$=Li$^+$, Na$^+$, K$^+$, Cr$^+$or Rb$^+$, and mixtures thereof;
$M^{II}$=Mg$^{2+}$, Ca$^{2+}$, Mn$^{2+}$, Fe$^{2+}$, Co$^{2+}$, Ni$^{2+}$ or Zn$^{2+}$, and mixtures thereof;
$M^{III}$=Mg$^{2+}$, Ca$^{2+}$, Sr$^{2+}$, Ba$^{2+}$, Zn$^{2+}$
$M^{IIII}$=Al$^{3+}$, Cr$^+$, Mn$^{3+}$, Co$^{3+}$, Ni$^{3+}$ or La$^{3+}$, and mixtures thereof;
$C^{n-}$=NO$_3^-$, SO$_4^{2-}$, CO$_3^{2-}$, CH$_3$CO$_2^-$, Cl$^-$, Br$^-$, F$^-$ or I$^-$ and
A=O$^{2-}$ or CO$_3^{2-}$; wherein
n=1,2
x=0.01 to 0.99;
y=0 to 4;
z=0.001 to 7; and
r=0 to 1.

Preferred modified double layered hydroxides are represented by the formula:

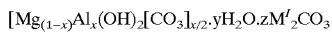

wherein
0,09≦x≦0.40
0≦y≦3.5, 0≦z≦3.5 and
M$^I$=Na or K.

The modified and non-modified spinels which possess utility as CO$_2$ adsorbents are represented by the generic formula:

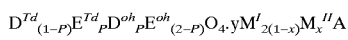

in which "Td" indicates cation occupation of tetrahedral lattice site and "oh" indicates cation occupation of octahedral lattice site, $D^{Td}$ and $D^{oh}$ are metal cations or a combination of metal cations chosen from groups I-A, II-A, II-A, IV-A, V-A, I-B, II-B, IV-B, V-B, VI-B, VII-B and VIII of the periodic table of the elements;

$E^{Td}$ and $E^{oh}$ are individually selected metal cations selected from groups I-A, III-A, IV-A, V-A, I-B, II-B, IV-B, V-B, VI-B, VII-B, VIII of the periodic table of the elements; such that the value of the octahedral to tetrahedral bond length ratio, R, of the metal cations $D^{Td}$, $E^{Td}$, $D^{oh}$ and $E^{oh}$ falls within the range of 1.155>R>0.886, wherein $M^I$=Li$^+$, Na$^+$, K$^+$, Cs$^+$, Rb$^+$
$M^{II}$=Mg$^{+2}$, Ca$^{+2}$, Sr$^{+2}$, Zn$^{+2}$, Ba+$^2$
X=0 to I; A=O$^{2-}$, CO$_3^{2-}$ and Y=0 to 7.

Preferred spinels which are suitable for use as CO$_2$ adsorbent under high temperatures in the presence of large amounts of water are represented by the formula Mg[Al$_2$]O$_4$.y K$_2$CO$_3$ wherein 0≦y≦3.5.

As the compressed feed gas passes upward through the adsorber column 15, CO$_2$ is selectively adsorbed to yield adsorber effluent gas that is depleted or virtually free of CO$_2$. This adsorber effluent gas is discharged into manifold 68 via open valve 70 in line 55. A portion of the CO$_2$-depleted gas may be withdrawn to provide a CO$_2$-depleted gas product as indicated at 71. This CO$_2$-depleted gas product may be used for other purposes or vented. The adsorption step proceeds for a typical period, e.g., about sixty seconds, which is short of allowing a breakthrough of CO$_2$ in the effluent that is beyond a predetermined acceptable level, e.g., 50 ppm CO$_2$. The adsorption step is then terminated by closing valves 35 and 70. The time periods desired for each of the steps in the cycle are predetermined; these are pre-set and controlled in known ways by a cycle timer or an analyzer-computer system which senses the breakthrough CO$_2$ limit.

At the completion of the designed adsorption step in column 15, valves 35 and 70 are closed and the feed introduction is switched to a companion column (20 or 25) which has been brought to adsorption pressure as will hereinafter be described. Thus, each of the columns 20 and 25, in turn, will receive mixed gas from manifold 30, through its associated lines 51 and 52, respectively, and valves 40 and 45, respectively, and discharge CO$_2$-depleted effluent into manifold 68 through associated lines 60 and 65.

At the termination of the adsorption step, the adsorption column 15 is next subjected to a depressurization step whereby the adsorption column 15 is reduced in pressure from $P^F$ to near ambient level, i.e., to approximately 1.0 atm., by the withdrawal of gas therefrom in a direction opposite or countercurrent to that of the earlier feed gas flow therein. Such withdrawal of gas is effected by controlled opening of the valve 79 which desorbs CO$_2$ adsorbed during the previous step on the adsorbent in column 15. The effluent resulting from the depressurization step, a CO$_2$-enriched gas, typically is vented as waste gas, but may be a useful product in some situations. The depressurization step is terminated by closing of valve 79. The depressurization step lasts approximately 15 seconds.

Next, a steam purge step is performed wherein a purge gas 115 comprised of steam superheated to approximately $T^F$ (feed temperature) is passed into the adsorption column 15 at sub-atmospheric pressure level. Thus, the purge step is carried out under a vacuum.

Prior to introduction into the adsorption column 15, the partial pressure of CO$_2$ in the purge gas is essentially zero. The purge gas is introduced from a source 115 into the adsorber column 15 through a conduit 120 in a direction opposite to, or countercurrent to, that of the feed gas during the adsorption step. Valves 125 and 130 are opened during this step. Because the purge gas is devoid of CO$_2$ prior to introduction into the adsorption column 15, it provides an efficient driving force for desorption of CO$_2$ during this step. The effluent gas resulting from this step is primarily a mixture of CO$_2$, H$_2$O, and non-adsorbing components of the feed gas, e.g., nitrogen.

The pressure reduction during the steam purge step can be achieved by any means such as by using a vacuum pump 145. Preferably, in accordance with the present invention, the pressure reduction during the steam purge step is accomplished by flowing the steam through an ejector 140 and condensing the steam, which will result in a vacuum in the adsorption column 15. The ejector is an inexpensive means for producing a moderate vacuum within the adsorption column 15. If the ejector is not sufficient alone in creating the necessary level of vacuum, the vacuum pump 145 may be joined in series with it on conduit 135. The details concerning the design and operation of ejectors is well known to those skilled in the art and need not be further discussed herein.

Next, the effluent gas resulting from the steam purge step is cooled to condense out the H$_2$O to produce a CO$_2$-enriched gas. The CO$_2$ product can be stored in a vessel 90 and used partially as a rinse gas for a rinse step to be described below in connection with a second embodiment and a third embodiment of the present invention. Another portion of the CO$_2$ stored within the vessel 90 may be withdrawn as a CO$_2$ product gas 137.

In the final step, repressurization, the adsorption column 15 is brought back to the pressure level of the feed gas by using part of the $CO_2$-depleted effluent obtained during the adsorption step. The repressurizing gas employed in this step may be obtained from the effluent gas from another adsorption column, e.g., adsorption column 25, then on the adsorption step. The direction of gas flow into the adsorption column 15 during this step is opposite to that of the initial feed flow, i.e., it is countercurrent. The adsorption column 15 is now ready to undergo another cycle of operation according to the scheme of this embodiment. Alternatively, repressurizing gas employed in this step may be obtained from a storage vessel (not shown) containing the $CO_2$-free product 71 at $P^F$ (feed pressure).

Referring now to FIG. 3, a diagram is set forth demonstrating the cycle of the pressure swing adsorption process of the present invention as described under the first embodiment above. As best shown in FIG. 3, the total cycle time for each adsorption column is approximately three minutes with the adsorption step lasting approximately one minute, the depressurization step lasting approximately thirty seconds, the countercurrent steam purge step lasting approximately one minute, and the repressurization step lasting approximately thirty seconds. As best shown in FIG. 3, the adsorption columns 15, 20 and 25 undergo the same sequence of operations during the assigned time cycle. Each of the columns 20 and 25, in turn, goes through the same sequence of steps as described for adsorption column 15. It should be obvious to one skilled in the art that other cycle time combinations using a total cycle time of 20 seconds to 600 seconds can be employed to operate the sequence described by FIG. 3.

In a second embodiment, the aforementioned steps of (1) adsorption, (2) countercurrent depressurization, (3) countercurrent steam purge and (4) countercurrent repressurization are performed in that order. However, in the second embodiment, a co-current $CO_2$ rinse step, i.e., step 1(a), is performed after the adsorption step (1) and before the countercurrent depressurization step (2). The purpose of the rinse step is to obtain essentially pure $CO_2$ in the subsequent depressurization step. The $CO_2$ rinse step will now be described in detail.

After the adsorption step has been performed, void spaces within the adsorption column are essentially filled with the components of the feed gas. In the rinse step, a stream of essentially pure $CO_2$ at $T^F$ and near ambient pressure is introduced from a storage vessel 90 through a feed conduit 95, and brought up to feed pressure by means of a compressor or blower 100. The rinse stream is introduced into the adsorber column 15 through open valve 105 in a direction the same as that of the feed flow of the adsorption step. In other words, the rinse step is co-current to the feed direction using a stream essentially rich in $CO_2$. During the rinse step, the non-adsorbed feed gas within the void spaces of the adsorber column is pushed out by the stream of essentially pure $CO_2$ and vented through valve 110. Thus, non-$CO_2$ components of the gas within the adsorber column 15 are replaced with $CO_2$. The effluent from adsorber column 15 during the rinse step includes voids and displaced (adsorbed) gases from the adsorbent bed and is of a composition similar to that of the initial feed gas. This rinse effluent may be wasted or recycled as feed gas for a subsequent adsorption step. The rinsing of the adsorption column 15 is continued until the entire column is essentially saturated with the rinse gas. Due to this rinse step, during the depressurization step that follows, the effluent gas desorbed from the adsorption column is essentially pure $CO_2$ which can be partly withdrawn as $CO_2$-enriched product or partly recompressed and recycled as rinse gas for a subsequent rinse step.

Referring now to FIG. 4, the cycle of the pressure swing adsorption process of the present invention is illustrated for the second embodiment described above. As best shown in FIG. 4, the total cycle time for each adsorption column is approximately three minutes with the adsorption step lasting approximately one minute, the $CO_2$ rinse step lasting approximately fifteen seconds, the depressurization step lasting approximately fifteen seconds, the countercurrent steam purge step lasting approximately one minute, and the repressurization step lasting approximately thirty seconds. As best shown in FIG. 4, the adsorption columns 15, 20 and 25 undergo the same sequence of operations during the assigned time cycle. Each of the columns 20 and 25, in turn, goes through the same sequence of steps as described for adsorption column 15. It should be obvious to one skilled in the art that other cycle time combinations using a total cycle time of 20 seconds to 600 seconds can be employed to operate the sequence described by FIG. 4.

In a third embodiment, the aforementioned steps of (1) adsorption, (2) countercurrent depressurization, (3) countercurrent steam purge and (4) countercurrent repressurization are performed in that order. However, in this embodiment, a co-current $CO_2$ rinse step, i.e., step 2(a), is performed after the countercurrent depressurization step (2) and before the countercurrent steam purge step (3). The purpose of the rinse step is to obtain pure $CO_2$ (dry basis) during the subsequent steam purge step. The co-current $CO_2$ rinse step performed in this embodiment is substantially the same as that described in the second embodiment except that it occurs after the countercurrent depressurization step in the third embodiment, rather than after the adsorption step, and thus the rinse gas does not have to be pressurized prior to introduction into the adsorption column 15. The rinse step is performed at approximately 1.0 atm. Due to this rinse step, the effluent that results from the countercurrent steam purge that follows is essentially a mixture of $CO_2$ and $H_2O$ only. Removal of $H_2O$ from that effluent by condensation produces an essentially pure $CO_2$ product, part of which can be used as rinse gas in a subsequent rinse step, and part of which can be withdrawn as $CO_2$ product gas.

Referring now to FIG. 2, the cycle of the pressure swing adsorption process of the present invention is illustrated for the third embodiment described above. As best shown in FIG. 2, the total cycle time for each adsorption column is approximately three minutes with the adsorption step lasting approximately one minute, the depressurization step lasting approximately fifteen seconds, the rinse step lasting approximately fifteen seconds, the countercurrent steam purge step lasting approximately one minute, and the repressurization step lasting approximately thirty seconds. As best shown in FIG. 2, the adsorption columns 15, 20 and 25 undergo the same sequence of operations during the assigned time cycle. Each of the columns 20 and 25, in turn, goes through the same sequence of steps as described for adsorption column 15. It should be obvious to one skilled in the art that other cycle time combinations using a total cycle time of 20 seconds to 600 seconds can be employed to operate the sequence described by FIG. 2.

It is important to note that in the embodiments of the process described herein, adsorption of $CO_2$ from the mixed gases is achieved as the result of deliberate adjustments to pressure rather than deliberate adjustments to temperature. Although temperature within the adsorption column 15 is not deliberately adjusted under any of the processes described above, some changes in temperature will occur within the adsorption column due to adiabatic heating or cooling. For example, a rise in temperature will occur within an adsorption column as $CO_2$ is adsorbed due to adiabatic heating. Likewise, a lowering of temperature will occur within an adsorption column as the result of desorption of $CO_2$ therein.

The essential characteristics of the present invention are described completely in the foregoing disclosure. One skilled in the art can understand the invention and make various modifications without departing from the basic spirit of the invention, and without deviating from the scope and equivalence of the claims which follow the examples below.

EXAMPLE 1

The process described under the first embodiment is carried out using an adsorption column packed with 1624.5 gms of $CO_2$ chemisorbent comprised of $Na_2O$ supported on alumina. The adsorption column diameter is 3.8 cm and its length is 183 cm. The adsorption column is initially pressurized with $N_2$ at a pressure of 8.62 bar and at a temperature of 200° C. A feed gas containing 10% (mole) $CO_2$ and 90% (mole) $N_2$ at a pressure of 8.62 bar and at a temperature of 200° C. is introduced into the column for 100 seconds. The total amount of feed gas used is 1.33 gm moles. An effluent gas containing less than 25 ppm $CO_2$ at nearly feed pressure and temperature is withdrawn from the column. The column is then counter-currently depressurized from 8.62 bar to 1.34 bar and a gas stream containing approximately 13.6% $CO_2$ is withdrawn. This gas can be recycled as feed gas after recompression. The adsorption column is then evacuated counter-currently utilizing a vacuum pump and then purged with steam at a pressure of 0.17 bar with steam introduced through the product end of the adsorption column. The effluent gas contains 55.0% $CO_2$ and 45% $N_2$ on a dry basis. Finally, the adsorption column is pressurized to 8.62 bar by using a part of the $CO_2$-free effluent gas resulting from the adsorption step and the cycle is repeated. The net $CO_2$-free effluent gas from the process is 0.75 gm moles. Thus, the net $CO_2$-free $N_2$ recovery from the feed gas is 62.6%. This demonstrates that the proposed process can be used to remove $CO_2$ from a feed gas at high temperature.

EXAMPLE 2

The process described under the second embodiment is carried out using an adsorption column packed with 1624.5 gms of $CO_2$ chemisorbent comprised of $NA_2O$ supported on alumina. The adsorption column diameter is 3.8 cm and its length is 183 cm. The adsorption column is initially filled with $N_2$ at a pressure of 8.62 bar and at a temperature of 200° C. A feed gas containing 10% (mole) $CO_2$ and 90% (mole) $N_2$ at a pressure of 8.62 bar and a temperature of 200° C. is introduced into column for 100 seconds. The total amount of feed gas used is 0.87 gm moles. An effluent gas containing 2.8% $CO_2$ at nearly feed pressure and temperature is withdrawn from the column. The column is then rinsed co-currently with pure $CO_2$ at ~9.0 bar and 200° C. and the effluent gas is recycled by mixing it with fresh feed gas. The adsorption column is then counter-currently depressurized from 9.0 bar to 1.34 bar and a gas stream containing ~99+% $CO_2$ is withdrawn. This gas can be recycled as $CO_2$ rinse gas after recompression. The adsorption column is then evacuated counter-currently utilizing a vacuum pump and then purged with steam at a pressure of 0.17 bar, the steam being introduced through the product end of the adsorption column. The effluent gas contains ~99+% $CO_2$ on a dry basis. The water is condensed and an essentially pure $CO_2$ stream is produced. A part of this stream is recycled as $CO_2$ rinse gas after recompression and the balance is withdrawn as $CO_2$ product. The quantity of this product is 0.067 gm moles. The column is then pressurized to 8.62 bar by using a part of the 2.8% $CO_2$ effluent gas obtained from the adsorption step and the cycle is repeated. The net $CO_2$ depleted effluent gas (2.8% $CO_2$) from the process is 0.78 gm moles. Thus, the net inert gas recovery from the feed gas is approximately 100%. The pure $CO_2$ recovery from the feed gas is approximately 78%. This demonstrates that the proposed process can be used to remove $CO_2$ from feed gas at high temperature and simultaneously recover $CO_2$ as a pure by-product.

Although this invention has been illustrated by reference to specific embodiments and examples, it will be apparent to those skilled in the art that various changes and modifications may be made which clearly fall within the scope of the invention.

What is claimed is:

1. A pressure swing adsorption process for the separation of a feed gas mixture containing at least one adsorbable component, comprising the steps of:
   (a) introducing at an elevated temperature and at an elevated pressure said feed gas mixture into a feed end of an adsorber column containing an adsorbent which preferentially adsorbs said at least one adsorbable component at said elevated temperature and pressure, withdrawing from a product end of said adsorber column a first adsorber effluent depleted of said at least one adsorbable component;
   (b) depressurizing said adsorber column by withdrawing therefrom a depressurization gas enriched in said at least one adsorbable component;
   (c) purging said adsorber column at sub-atmospheric pressure by introducing into said adsorber column steam heated to a temperature at or near that of said feed gas mixture and withdrawing from said adsorber column a second adsorber effluent comprising a mixture of said at least one adsorbable component and $H_2O$;
   (d) pressurizing said adsorber column to approximately said elevated pressure by introducing into said adsorber column a repressurizing gas depleted of said at least one adsorbable component; and,
   (e) repeating steps (a) through (d) in a cyclic manner.

2. A process as in claim 1, wherein said at least one adsorbable component is $CO_2$.

3. A process as in claim 1, wherein said adsorbent is selected from the group consisting of $K_2CO_3$ promoted hydrotalcite, $Na_2O$ impregnated alumina, and double salt extrudates.

4. A process as in claim 1, wherein said depressurization gas in step (b) flows countercurrent to said feed gas mixture in step (a).

5. A process as in claim 1, wherein said steam in step (c) flows countercurrent to said feed gas mixture in step (a).

6. A process as in claim 1, wherein said gas depleted of said one adsorbable component in pressurization step (d) flows countercurrent to said feed gas mixture in step (a).

7. A process as in claim 1, wherein immediately prior to said depressurizing step (b), said process comprises the further steps of discontinuing the introducing of said feed gas mixture and, at said elevated pressure and elevated temperature, rinsing said adsorber column with a gas stream rich in said at least one adsorbable component, wherein said gas stream flows co-current with said feed gas mixture in step (a).

8. A process as in claim 7, wherein immediately following said purging step (c), said process comprises the further step of removing H$_2$O from said mixture of said at least one adsorbable component and H$_2$O by condensation to obtain said gas stream rich in said at least one adsorbable component.

9. A process as in claim 7, wherein said depressurization gas is essentially pure CO$_2$ suitable for use in a subsequent rinse step.

10. A process as in claim 7, wherein said gas stream rich in said at least one adsorbable component is CO$_2$ that is suitable for use in a subsequent rinse step.

11. A process as in claim 1, wherein immediately following said depressurizing step (b), said process comprises the further step of rinsing said adsorber column at elevated temperature with a gas stream rich in said at least one adsorbable component, wherein said gas stream flows co-current with said feed gas mixture in step (a).

12. A process as in claim 11, wherein immediately following said purge step (c), said process comprises the further step of removing H$_2$O from said mixture of said at least one adsorbable component and H$_2$O by condensation to obtain said gas stream rich in said at least one adsorbable component.

13. A process as in claim 11, wherein said step (a) has a duration of about 60 seconds, step (b) has a duration of about 15 seconds, said rinsing step has a duration of about 15 seconds, step (c) has a duration of about 60 seconds, and step (d) has a duration of about 30 seconds.

14. A process as in claim 11, wherein said gas stream rich in said at least one adsorbable component is CO$_2$ that is suitable for use in a subsequent rinse step.

15. A process as in claim 1, wherein said feed gas contains principally CO$_2$, CO, H$_2$, N$_2$, H$_2$O, H$_2$S+COS, said elevated temperature is about 300° C. to 400° C., and said at least one adsorbable component is CO$_2$.

16. A process as in claim 15, wherein said pressure of said feed gas mixture in step (a) is between 100 and 400 p.s.i.g.

17. A process as in claim 1, wherein said feed gas contains principally CO$_2$, CO, H$_2$, N$_2$, H$_2$O, CH$_4$, N$_2$, and H$_2$S, said elevated temperature is about 260° C., and said at least one adsorbable component is CO$_2$.

18. A process as in claim 17, wherein said pressure of said feed gas mixture in step (a) is between about 5 p.s.i.g. and about 60 p.s.i.g.

19. A process as in claim 1, wherein said adsorber column is depressurized during step (b) to a final pressure near an ambient pressure.

20. A process as in claim 1, wherein said feed gas mixture is maintained at about a near ambient superatmospheric pressure during step (a).

21. A process as in claim 1, wherein said feed gas mixture is maintained at a superatmospheric pressure during step (a) of between about 5 p.s.i.g. and about 60 p.s.i.g.

22. A process as in claim 21, wherein said superatmospheric pressure is between about 10 p.s.i.g. and about 500 p.s.i.g.

23. A process as in claim 21, wherein said superatmospheric pressure is approximately 300 p.s.i.g.

24. A process as in claim 1, wherein said feed gas mixture contains principally CO$_2$ and N$_2$ at a pressure of approximately 8.62 bar, said elevated temperature is about 200° C., said at least one adsorbable component is CO$_2$ and said adsorbent is Na$_2$O impregnated alumina.

25. A process as in claim 1, wherein said repressurizing gas is an adsorber effluent resulting from step (a).

26. A process as in claim 1 wherein during said step of purging, said adsorber column is maintained at a subatmospheric pressure between approximately 1.5 p.s.i.a. and 11.5 p.s.i.a.

27. A pressure swing adsorption apparatus for the separation of a feed gas mixture containing at least one adsorbable component, said apparatus comprising:

(a) an adsorber column containing an adsorbent which preferentially adsorbs said at least one adsorbable component at an elevated temperature and pressure, the adsorber column having a feed end and a product end;

(b) means for introducing at said elevated temperature and at said elevated pressure said feed gas mixture into the feed end of said adsorber column and withdrawing from the product end of said adsorber column a first adsorber effluent depleted of said at least one adsorbable component;

(c) means for depressurizing said adsorber column by withdrawing therefrom a depressurization gas enriched in said at least one adsorbable component;

(d) means for purging said adsorber column by introducing into said adsorber column steam heated to a temperature at or near that of said feed gas mixture and withdrawing from said adsorber column a second adsorber effluent comprising a mixture of said at least one adsorbable component and H$_2$O;

(e) means for pressurizing said adsorber column to approximately said elevated pressure by introducing into said adsorber column a repressurizing gas depleted of said at least one adsorbable component.

\* \* \* \* \*